United States Patent [19]
Breckner

[11] Patent Number: 5,179,513
[45] Date of Patent: Jan. 12, 1993

[54] PROCESS AND APPARATUS FOR THE CONTROL OF A PROCESS VARIABLE WHEN AN INDEFINITE MEASURING SIGNAL IS ENCOUNTERED

[75] Inventor: Kurt Breckner, Waiblingen, Fed. Rep. of Germany

[73] Assignee: Eckardt AG, Stuttgart, Fed. Rep. of Germany

[21] Appl. No.: 608,383

[22] Filed: Nov. 2, 1990

[30] Foreign Application Priority Data

Nov. 8, 1989 [DE] Fed. Rep. of Germany ....... 3937133

[51] Int. Cl.$^5$ .............................................. G05B 13/02
[52] U.S. Cl. ................................... 364/155; 364/162; 364/148
[58] Field of Search ............... 364/148, 152, 153, 154, 364/155, 162, 160

[56] References Cited

U.S. PATENT DOCUMENTS 3,480,765  11/1969  Rouxel et al. ....................... 364/155
3,515,860  6/1970   Fitzgerald, Jr. ..................... 364/155
4,545,008  10/1985  Sominin et al. ..................... 364/155

*Primary Examiner*—Jerry Smith
*Assistant Examiner*—Paul Gordon
*Attorney, Agent, or Firm*—Burns, Doane, Swecker & Mathis

[57] ABSTRACT

A system having a control variable, such as a proportion of a certain substance in a solution, maintains a set value of that control variable by obtaining a measuring signal as a function of the control value. That function is characterized by a curve having an extreme value dividing the curve into monotonically ascending and descending sections. The measuring signal is compared with a reference value corresponding to the set value of the control variable to obtain a different value. When the difference value lies within a predetermined range, a first signal generator is actuated to correct the deviation of the control variable. When the difference value lies outside of that range, a second signal generator is actuated to correct the deviation of the control value within a section of the curve which would be unstable if correction were instead to be made by the first signal generator.

10 Claims, 1 Drawing Sheet

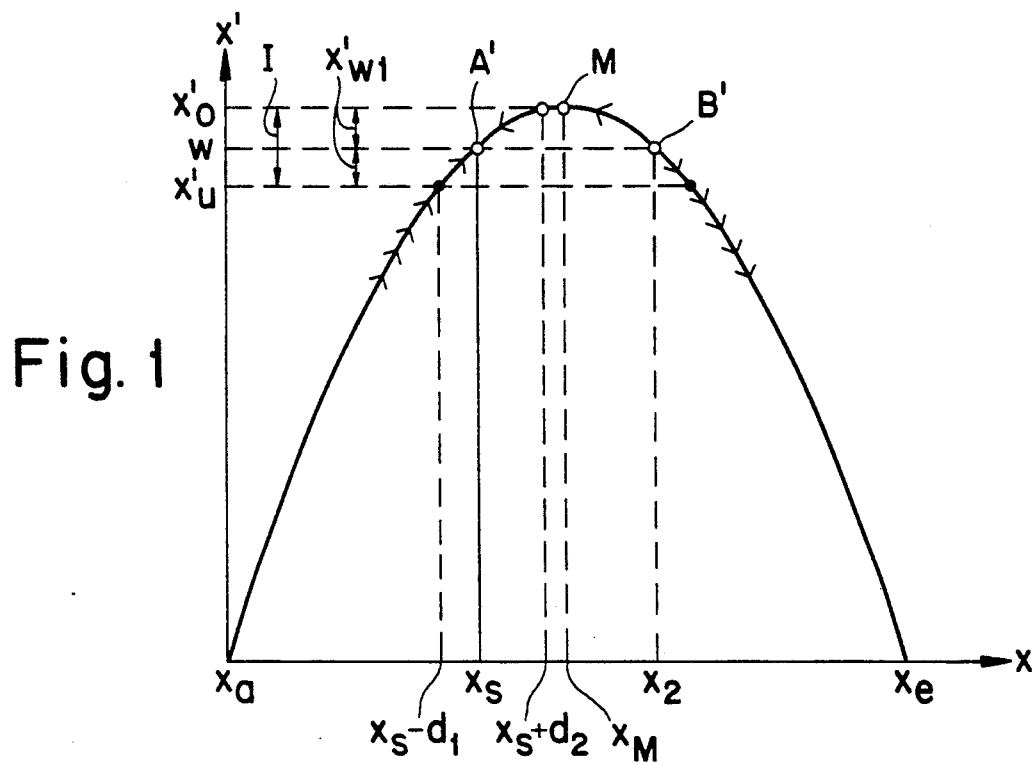
Fig. 1
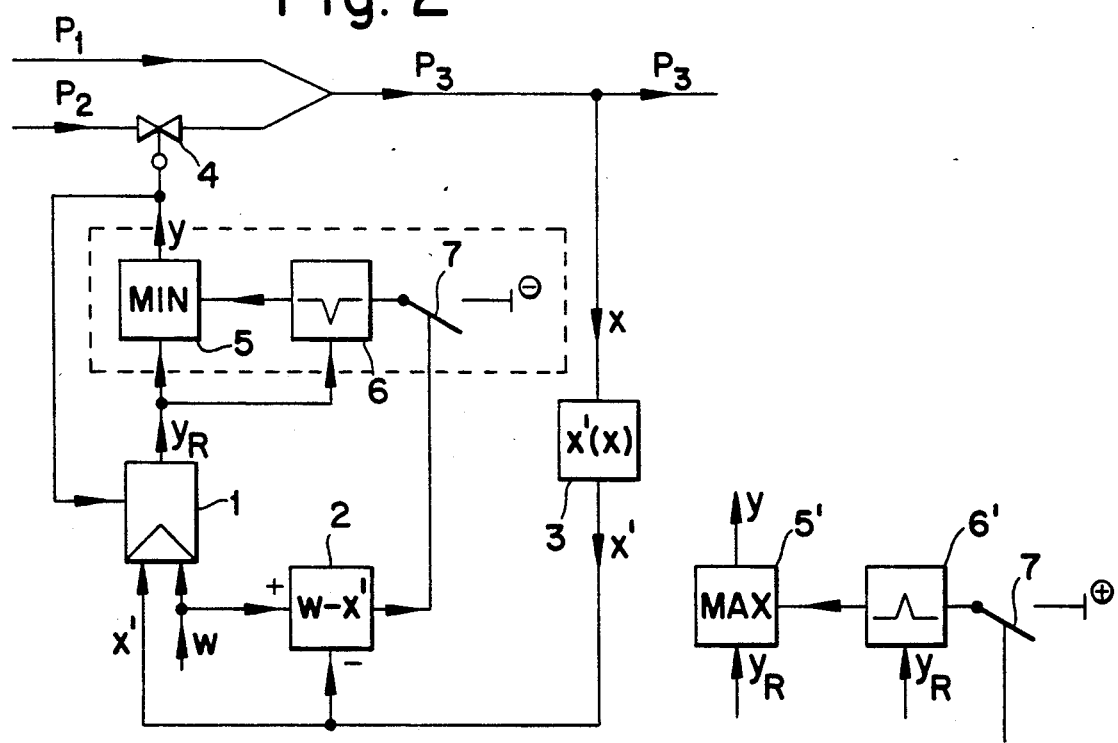
Fig. 2
Fig. 3

PROCESS AND APPARATUS FOR THE CONTROL OF A PROCESS VARIABLE WHEN AN INDEFINITE MEASURING SIGNAL IS ENCOUNTERED

BACKGROUND OF THE INVENTION

The invention concerns a process for the control of a variable, and an apparatus to carry out that process.

In a control circuit, frequently nonlinear functional parts with nonlinear characteristic curves are found. One example involves a nonlinear behavior of the measuring instrument so that the measuring signal passed to the control apparatus is no longer proportional to the control variable itself. In many cases this may be desirable, for example, for extracting the square root of a signal introduced as a control variable, and in other cases this may be taken into account by the suitable layout of the other control circuit components. There is, however, a problem if the characteristic of the measuring device is no longer monotonic in the measuring range, so that a certain measuring signal corresponds to several states of the control variable, including an unwanted state, i.e., the measuring signal no longer characterizes the control variable in an unambiguous manner. This results in the condition that the process involved is no longer controlled in a stable fashion over the entire control range by a known regulating device.

It is, therefore, an object of the invention to provide a process and an apparatus for the control of a process variable, whereby stable regulation is obtained in the simplest possible manner within a control range, in which the constant characteristic of the measuring device has an extreme value and is therefore not monotonic.

SUMMARY OF THE INVENTION

This object is attained by a process for controlling a variable value, wherein a measuring signal value is a constant non-linear function of the variable value so as to define a characteristic curve having an extreme value which divides the curve into a monotonically ascending section and a monotonically descending section. The process comprises producing the measuring signal value as a function of the variable value. A control signal value is provided which corresponds to the set value of the variable value and lying on one of the ascending and descending sections of the curve. The control signal value is compared to the measuring signal value and, in the event that a differential value exists between the control signal value and the measuring signal value, the differential value is delivered to a signal generating means which generates and supplies a correcting signal to a control element which changes the variable value in a manner causing the measuring signal value to approach the control signal value. When the differential value lies within a predetermined range, a first signal generator of the signal generating means generates the correcting signal. When the differential signal lies outside of that range, a second signal generator of the signal generating means generates the correcting signal.

The correcting signal which is generated can change the variable value in either direction, i.e., the direction by the first signal generator is dependent upon the sign of the differential value. On the other hand, the correcting signal generated by the second signal generator causes the variable value to change solely in a preselected direction regardless of the sign of the differential value.

In the process, the known control method is restricted to a range of the reference value of the control variable in which the known process is stable, while if the limits of this range are exceeded, regulation is assumed by an auxiliary device which returns the control variable to the stable working vicinity of the first signal generator, whereupon regulation is continued by the latter.

The return of the regulating signal to the first signal generator makes possible the reassumption of control by the known control without jolting. The necessary switching may be obtained if a predetermined difference is attained between a reference value and the measuring signal. It is desirable that the extreme value and thus the occurrence of larger deviations from the reference value is avoided. Preferably, the output signal from the first signal generator is fed to the second signal generator to make possible the continuous variation of the regulating signal during switching. Preferably, the output signal from the second signal generator constitutes the output signal from the first signal generator to which have been added extra pulse signals. This improves the process in that the correction signal differs from the output signal of the first signal generator merely by a sequence of individual pulse signals added to it. In addition to switching without jolting, this measure makes possible a relatively uniform return of the process variable compared to a constant addition signal, without having to accept a disturbingly large overshooting following the attainment of the switching point in time.

Other features of the invention render it possible in an especially simple manner to carry out the process by the installation of a few additional components in a known control circuit.

BRIEF DESCRIPTION OF THE DRAWING

The objects and advantages of the invention will become apparent from the following detailed description of preferred embodiments thereof in connection with the accompanying drawings, in which like numerals designate like elements, and in which:

FIG. 1 shows a constant non-monotonic characteristic curve of a substance which plots electrical conductivity as a function of acid concentration;

FIG. 2 depicts schematically a control apparatus to carry out the process according to the invention; and FIG. 3 depicts schematically an alternative section of the control apparatus to be substituted for the section framed by a broken line in FIG. 2.

DETAILED DESCRIPTION OF PREFERRED EMBODIMENTS OF THE INVENTION

A curve shown in FIG. 1 represents a non-monotonic characteristic of a measuring device. The measuring signal $x'$ initially ascends as a function of the process or control variable x monotonically, then assumes an extreme value point M and declines, again monotonically. Such a curve describes for example the conductivity $x'$ of a highly or super-concentrated sulfuric acid (oleum) as a function of concentration x, with the relative conductivity maximum being located at a concentration of $x_M$ $\overset{18}{\approx}$ 99.6%. It is therefore possible by the mixing of dilute sulfuric acid and oleum to obtain a highly concentrated sulfuric acid of certain concentration, in which the concentration is determined by means of conductivity measurements.

The controls are intended to maintain a set value $x_S$ of the control variable x. For that purpose initially a first signal generator in the form of a known PI(D) controller 1 is used (i.e., a controller having proportional, integral, and differential components), in which is set a reference value w of a measuring signal x' (corresponding to the value $x_S$ of the control variable). The controller 1 operates such that in the case of small deviations from the set value $x_S$, the output or correction signal $y_R$ of the controller 1 returns the control variable to $x_S$, if $y = y_R$ is used as the set signal. This operation of the controller is indicated by the arrows in FIG. 1; the controller therefore operates in a stable manner in the vicinity of the working point A'.

It will be appreciated that the slope of the FIG. 1 curve is steeper to the left of point A' than to the right of point A'. Consequently, equal deviations of the control variable x to the right and left of A' will result in different deviations of the measuring signal x'. More specifically, a given deviation of the control variable x in a direction toward $x_M$ will produce a smaller deviation of the measuring signal x' than would be produced by an equal but oppositely directed deviation of the control variable x. Consequently, deviations of the control variable x in a direction away from the extreme value $x_M$ can be more effectively corrected by the controller 1.

Deviations from the set value $x_S$ in a direction toward the extreme value point M are controlled less reliably. In particular, the extreme value point M might be exceeded (i.e., the control variable may exceed $x_M$) whereby the process passes from the region located to the left of point M (in which the characteristic rises monotonically) into the region located to the right of point M (in which it declines monotonically). As a result, in the region to the right of point M, the difference signal $x'_W = w - x'$ outputted by the controller 1 will decline in spite of an increasing deviation of the control variable x from the set value $x_S$, until such difference disappears entirely when the value $x_2$ of the control variable is attained at point B'. (This is the consequence of the ambiguity of the measuring signal: the control value w of the measuring signal x' corresponds to two non-equivalent values $x_S$ and $x_2$ of the control variable x.) Since the controller is set to achieve the working point A', it reacts in the case of a negative difference signal $x'_w$ by producing a correction signal y so that the control variable x is reduced, and in the case of a positive difference signal it reacts by producing a correction signal y which increases the control variable x. Thus, the control would function opposite the desired manner on the right-hand side of point B'. The point B' is, therefore, an unstable set point of the controller, as indicated by the arrows. If certain disturbances produce a value of the control variable greater than $x_2$, the controller creates ever-increasing values of the control variable, instead of returning it to the set value $x_S$.

To prevent this, a control apparatus according to the present invention is provided, a preferred embodiment of which is represented in FIG. 2. There, under the control of a control element 4, a product P1 (for example 96% sulfuric acid) and a product P2 (for example oleum) are mixed to produce a product P3 (for example 99% sulfuric acid). The measuring device 3 yields a measuring signal x' as a function of the control variable x, wherein x' represents the conductivity as a function of the concentration x of the sulfuric acid and corresponds to the shape of the curve in FIG. 1. The measuring signal enters the controller 1, to which the control value w is also applied. The controller 1 is set so that it functions in a stable manner in the vicinity of the point A'. The controller 1 determines the difference between the measuring signal x' and the control value w and generates the output signal $y_R$ in accordance with that difference. The output signal $y_R$ is conducted to a second signal generator in the form of a pulse generator stage 6 and a switch in the form of a minimum selection stage 5. In the open state of the switch 7 shown, the pulse generator stage 6 is not activated and the selection stage 5 passes the output signal $y_R$ of the controller 1 through as the correction signal y.

There is also provided a comparator 2 which outputs the actual difference signal $w - x'$ (hereinafter called $x'_W$) with a predetermined reference value $x'_{W1}$. Thus, the comparator 2 defines an interval or range I of the measuring signal extending between measuring signal values $x'_u$ and $x'_o$. If, as a result of certain disturbances (for example, variations in the concentrations of the initial products P1 and P2), the actual difference signal $x'_W$ exceeds $x'_{W1}$, the comparator activates the pulse generator stage 6 by closing the switch 7. This adds to the controller output signal $y_R$ a sequence of individual negative signal pulses and the resulting signal is emitted from the minimum selection stage 5 as the correction signal y. This results in a continuous variation of the adjusting signal $y_R$ and thus in switching without jolting.

The height, duration and timely sequence of the signal pulses must be selected so that the return of the control variable x into the range of $x < x_2$ (in which the controller 1 operates in a stable manner) is assured, for which under certain conditions a single pulse signal is sufficient. Thus, the upper limit of range I could correspond to point M. However, it is most desirable to prevent the exceeding of the extreme value M by activating the pulse generator stage before x exceeds $x_M$, i.e., when at $x = x_S + d_2$ as shown in FIG. 1, and returning the control variable into the range of $x < x_S + d_2$. Depending on the maximum allowable difference of the control value w and the measuring signal x' set in the comparator 2, the drifting of the control variable into the range $x > x_M$ can likely be prevented, but in any case the drifting of the control variable into the range $x > x_2$ will assuredly be prevented.

When the control variable x again attains a value whose corresponding measuring signal value x' is in the range I, the switch 7 is opened by the comparator 2, whereby the pulse generator stage 6 is deactivated and the controller output signal $y_R$ is re-established as the adjusting signal y by the selection stage 5, wherein due to the return of the existing adjusting signal y to the controller 1 this switch again takes place without jolting.

It is noted that the pulse generator stage is also activated in the $x < x_S - d_1$ range, whereupon the control variable x would tend to drift away from the set value $x_S$. That situation is easily dealt with by setting the integral component of the controller 1 to force the return of the control variable x in the direction of the set value $x_S$ after a selected period of time. In addition, the proportional component of the controller forces the return of x to $x_S$ as the value x becomes farther from $x_S$. That is, the known controller has integral and proportional components which function in a conventional manner to increase the size of the correction signal if the correction is not made after a preselected period of time and/or as the value of x becomes more distant from $x_S$. In the case where x is detected to the left of $x_{S-d_1}$, this functioning of the controller ensures that eventually the positive correction signal generated by the controller 1 will overcome the negative correction signal generated by the generator stage 6. No other devices to prevent the actuation of the pulse generator stage would be required in this case, so that the alterations to be carried out on the known control circuit may be restricted to a minimum. Thus, the present invention can be retro-fit to known control circuits.

The present invention could also be adapted to maintain the set value of the control variable x in the monotonically declining section of the curve rather than in the monotonically rising section (i.e., to the right of point M rather than to the left of point M). For example, the controller could be set so as to stabilize the control variable at a value which corresponds to point B' on the FIG. 1 curve. For this purpose, the controller 1 must be set differently, and the devices framed in FIG. 2 by a broken line must be replaced by the corresponding devices shown in FIG. 3. The pulse generator stage 6' then applies, upon activation, positive signal pulses to the controlled output signal $y_R$ and a maximum selection stage 5' must be provided as the selection stage.

It will also be appreciated that an analogous method must be used if the extreme value M is not a maximum but a minimum.

Although the present invention has been described in connection with preferred embodiments thereof, it will be appreciated by those skilled in the art that additions, modifications, deletions and substitutions not specifically described may be made without departing from the spirit and scope of the invention as defined in the appended claims.

What is claimed is:

1. A process for controlling a variable value, wherein a measuring signal value is a constant nonlinear function of said variable value so as to define a characteristic curve having an extreme value which divides said curve into a monotonically ascending section and a monotonically descending section, said process comprising the steps of:

producing said measuring signal value as a function of said variable value, providing a control signal value corresponding to a set value of said variable value and lying on one of said ascending and descending sections of said curve, comparing said control signal value to said measuring signal value and, in the event that a differential value exists between said control signal value and said measuring signal value, said differential value is delivered to a signal generating means which generates and supplies a correcting signal to a control element which changes said variable value in a manner causing said measuring signal value to approach said control signal value, said differential value is delivered to said signal generating means by:

delivering said differential value to operate a first signal generator of said signal generator means when said differential value lies within a predetermined range, whereupon said first signal generator generates said correcting signal, and delivering said differential value to operate a second signal generator of said signal generating means when said differential signal lies outside of said range, wherein said second signal generator generates said correcting signal.

2. A process according to claim 1, wherein the correcting signal generated by said first signal generator causes said variable value to change selectively in either an increasing or decreasing direction, said direction depending upon the sign of said differential value; the correcting signal generated by said second signal generator causing said variable value to change solely in a preselected direction regardless of the sign of said differential value.

3. A process according to claim 1, wherein said range has a maximum value lying on said curve.

4. A process according to claim 3, wherein said maximum value is less than said extreme value.

5. A process according to claim 1, wherein an output signal of said first signal generator is delivered to said second signal generator.

6. A process according to claim 5, wherein said correcting signal generated by said second signal generator comprises said output of said first signal generator on which an additional pulse signal is superimposed.

7. Apparatus for controlling a variable value, wherein a measuring signal value is a constant nonlinear function of said variable value so as to define a characteristic curve having an extreme value which divides said curve into a monotonically ascending section and a monotonically descending section, said apparatus comprising:

control means for changing said variable value, producing means for producing said measuring signal value as a function of said variable value, providing means for providing a control signal value corresponding to a set value of said variable value and lying on one of said ascending and descending sections of said curve, comparing means for comparing said control signal value to said measuring signal value to determine whether a differential value exists between said control signal value and said measuring signal, signal generating means for receiving said differential value and for generating and supplying a correcting signal to said control means for changing said variable value in a manner causing said measuring signal value to approach said control signal value, said signal generating means comprising:

a first signal generator for generating a correcting signal when said differential value lies within a predetermined range, a second signal generator for generating a correcting signal when said differential signal lies outside of said range.

8. Apparatus according to claim 7, wherein said first signal generator generates a correcting signal for causing said variable value to change selectively in either an increasing or decreasing direction, said direction depending upon the sign of said differential value; said second signal generator generating a correcting signal for causing said variable value to change solely in a preselected direction regardless of the sign of said differential value.

9. Apparatus according to claim 8, wherein said second signal generator is connected to said first signal generator to receive an output signal from the latter, said second signal generator being operable to superimpose additional pulse signals on said output signal to produce a correcting signal.

10. Apparatus according to claim 9 including a switching device in the form of a minimum selection stage connected to receive output signals from said first and second signal generators, said switching device connected to said control means.

* * * * *